United States Patent
Mikuma et al.

(10) Patent No.: US 7,197,608 B2
(45) Date of Patent: Mar. 27, 2007

(54) SOFTWARE MANAGEMENT METHOD FOR A STORAGE SYSTEM, AND STORAGE SYSTEM

(75) Inventors: Ayumi Mikuma, Kawasaki (JP); Ikuko Kobayashi, Kawasaki (JP); Shinji Kimura, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 64 days.

(21) Appl. No.: 10/887,844

(22) Filed: Jul. 12, 2004

(65) Prior Publication Data

US 2005/0228948 A1   Oct. 13, 2005

(30) Foreign Application Priority Data

Apr. 13, 2004   (JP) ............................. 2004-117432

(51) Int. Cl.
*G06F 12/00* (2006.01)

(52) U.S. Cl. .................. 711/151; 711/112; 711/114; 711/147; 711/152

(58) Field of Classification Search .................... None
See application file for complete search history.

(56) References Cited

U.S. PATENT DOCUMENTS

| | | | |
|---|---|---|---|
| 6,061,773 A | | 5/2000 | Harvey et al. |
| 6,148,387 A | | 11/2000 | Galasso et al. |
| 6,286,087 B1 | | 9/2001 | Ito et al. |
| 6,343,324 B1 | | 1/2002 | Hubis et al. |
| 6,421,711 B1 | * | 7/2002 | Blumenau et al. ........... 703/213 |
| 6,507,905 B1 | | 1/2003 | Hubacher et al. |
| 6,691,213 B1 | | 2/2004 | Luu et al. |
| 6,751,658 B1 | * | 6/2004 | Haun et al. .................. 709/222 |
| 6,775,830 B1 | | 8/2004 | Matsunami et al. |
| 6,813,522 B1 | | 11/2004 | Schwarm et al. |
| 6,820,168 B2 | | 11/2004 | Tanaka et al. |
| 6,857,041 B2 | | 2/2005 | LeClerg |
| 7,051,165 B2 | * | 5/2006 | Kimura et al. .............. 711/147 |
| 2002/0016891 A1 | | 2/2002 | Noel et al. |
| 2003/0126242 A1 | * | 7/2003 | Chang ......................... 709/222 |
| 2003/0217123 A1 | * | 11/2003 | Anderson et al. ........... 709/219 |
| 2004/0015522 A1 | * | 1/2004 | Hensbergen ................. 707/204 |
| 2004/0139309 A1 | | 7/2004 | Gentil et al. |
| 2004/0186898 A1 | * | 9/2004 | Kimura et al. .............. 709/213 |
| 2004/0186961 A1 | * | 9/2004 | Kimura et al. .............. 711/138 |
| 2005/0021727 A1 | | 1/2005 | Matsunami et al. |
| 2005/0138287 A1 | | 6/2005 | Ogasawara et al. |

FOREIGN PATENT DOCUMENTS

JP   2000-259583   9/2000

OTHER PUBLICATIONS

English Language Translation of Patent Laid-Open Publication No. 2000-259583, Sep. 22, 2000.
Cisco Network Boot Installation and Configuration Guide, Release 2.1, 2002.

* cited by examiner

*Primary Examiner*—Reginald Bragdon
*Assistant Examiner*—Horace L. Flournoy
(74) *Attorney, Agent, or Firm*—Antonelli, Terry, Stout and Kraus, LLP.

(57) ABSTRACT

The storage system creates a volume for storing information specific to a user, and a volume for storing software shared by a plurality of users, links these volumes on the basis of the software usage status of the users, and virtually builds one region and supplies same to the users.

17 Claims, 15 Drawing Sheets

FIG.4

| USER NAME | CLIENT NAME | VIRTUAL VOLUME NAME | VOLUME NAME | SOFTWARE NAME | | | | |
|---|---|---|---|---|---|---|---|---|
| | | | | OS1 | OS2 | AP1 | AP2 | AP3 |
| | | | | PDC1 | PDC2 | PDC3 | PDC4 | PDC5 |
| USER 1 | 100a | VDa | PDUa | ○ | | ○ | | ○ |
| USER 2 | 100b | VDb | PDUb | ○ | | | ○ | ○ |

| FILE NAME | STORAGE DATA REGION | | | WRITE DESTINATION | | | READ DESTINATION | | |
|---|---|---|---|---|---|---|---|---|---|
| | VOLUME NAME | ATTRIBUTE | REGION | VOLUME NAME | ATTRIBUTE | REGION | VOLUME NAME | ATTRIBUTE | REGION |
| FILE 1 | PDC1 | SHARED | 003 | PDUa | PRIVATE | 001 | PDUa | PRIVATE | 001 |
| FILE 2 | PDC3 | SHARED | 002 | | | | PDC3 | SHARED | 002 |
| FILE 3 | | | 024 | PDUa | | 008 | PDUa | PRIVATE | 008 |
| FILE 4 | PDUa | PRIVATE | 024 | PDUa | | 024 | PDUa | PRIVATE | 024 |
| FILE 5 | PDC1 | SHARED | 012 | | | | | | |
| ... | | | | | | | | | |

225

SOFTWARE MANAGEMENT METHOD FOR A STORAGE SYSTEM, AND STORAGE SYSTEM

CROSS-REFERENCES TO RELATED APPLICATIONS

This application relates to and claims priority from Japanese Patent Application No. 2004-117432, filed on 2004 Apr. 13, the entire disclosure of which is incorporated herein by reference.

BACKGROUND OF THE INVENTION

The present invention relates to a software management method of a mass storage device that is accessed by a plurality of clients.

In companies and so forth, large-scale computer systems in which a plurality of computers (hereinafter 'client computers') are mutually connected via a network are built. In such computer systems, a variety of data, programs, and the like, used when a task is executed by means of each of the client computers, are provided, and hence a mass storage device is connected to the network of the computer system. Here, a mass storage device is a mass storage device system or similar that comprises a multiplicity of hard disk devices. The mass storage device is shared by a plurality of client computers. Further, storage regions contained in the mass storage device are allocated to each of the client computers. The user of each client computer uses the storage region allocated to them to store and read data, software, and so forth.

One usage method of a mass storage device connected to the network is a method of starting up a client computer known as 'remote booting'. In remote booting, the operating system required to start up the client computer, a variety of files such as the configuration files, and application programs, and so forth, are stored in the storage region for each user of the mass storage device in advance. Each client computer is able to start itself up by reading these files from the mass storage device via a network.

By using remote booting, the client computers do not require a mass storage device (hard disk device or similar, for example) for storing a variety of files or the like. In addition, the software (including the OS, and application programs) used by the client computer can be integrally managed in the mass storage device, meaning that there is no need for work such as updates, virus checks, or the like, for each client computer.

Technology that relates to the shared OS and shared application programs of the abovementioned remote booting is disclosed in Japanese Patent Application No. 2000-259583.

SUMMARY OF THE INVENTION

However, in the prior art, even when an OS, application program, and the like, are shared by a plurality of client computers by means of one mass storage device, information relating to the setting of software for a usable software license, personal information, and various configuration data must be managed and set manually by the administrator of the mass storage device or by each client computer, thus rendering management complicated.

In order to resolve the above problem, a mass storage device constituting an embodiment of the present invention has the following constitution. The mass storage device comprises a shared volume that is shared by a plurality of users, and private volumes that contain data specific to each user. The mass storage device links these shared volumes and private volumes and allocates these volumes to each user as virtual volumes. The mass storage device manages, with respect to the shared volume and private volumes, the association between the users using the software contained in the shared volume and the private volumes used by the users, and stores setting information for each piece of software in the private volume.

A command for designating a virtual volume and reading data is transmitted by the computer used by the user to the mass storage device. Based on the association mentioned above, the mass storage device reads data corresponding with the virtual volume designated by the read command from the private volume corresponding with the user or from the shared volume. Identification of the user can be performed by means of address information specifying the computer and ID information to specify the user and usage environment, and so forth.

So that the user uses the software, the mass storage device carries setting information for the software corresponding with each user. When a virtual volume is allocated to each user, the mass storage device sets the virtual volumes so that the data writing of software setting information generated for each shared volume by the computer used by the user is transferred to the private volume of the corresponding user.

Further, the mass storage device provides each volume with a search order for searching for data for which a read designation is received by the user, thereby rendering a hierarchical structure. More specifically, the mass storage device prioritizes the search for the private volume corresponding with the user that issued the read command over the search for the shared volume where the software is stored.

Although software shared by a plurality of users is mainly stored in each shared volume, there is no absolute need to store only the software supplied in shared fashion to a plurality of users. Software specific to any user or data that is shared by a plurality of users may be mixed.

The mass storage device may also manage software licenses. In this case, it is desirable to store the software in the shared volume in units based on the licensing arrangement prescribed by the software provider.

BRIEF DESCRIPTION OF THE DRAWINGS

FIG. 4 is an explanatory view of the constitution of the volume management table 221;

FIG. 9 is an explanatory view of the structure of a data address management table 225;

DESCRIPTION OF THE PREFERRED EMBODIMENTS

Figure 1:
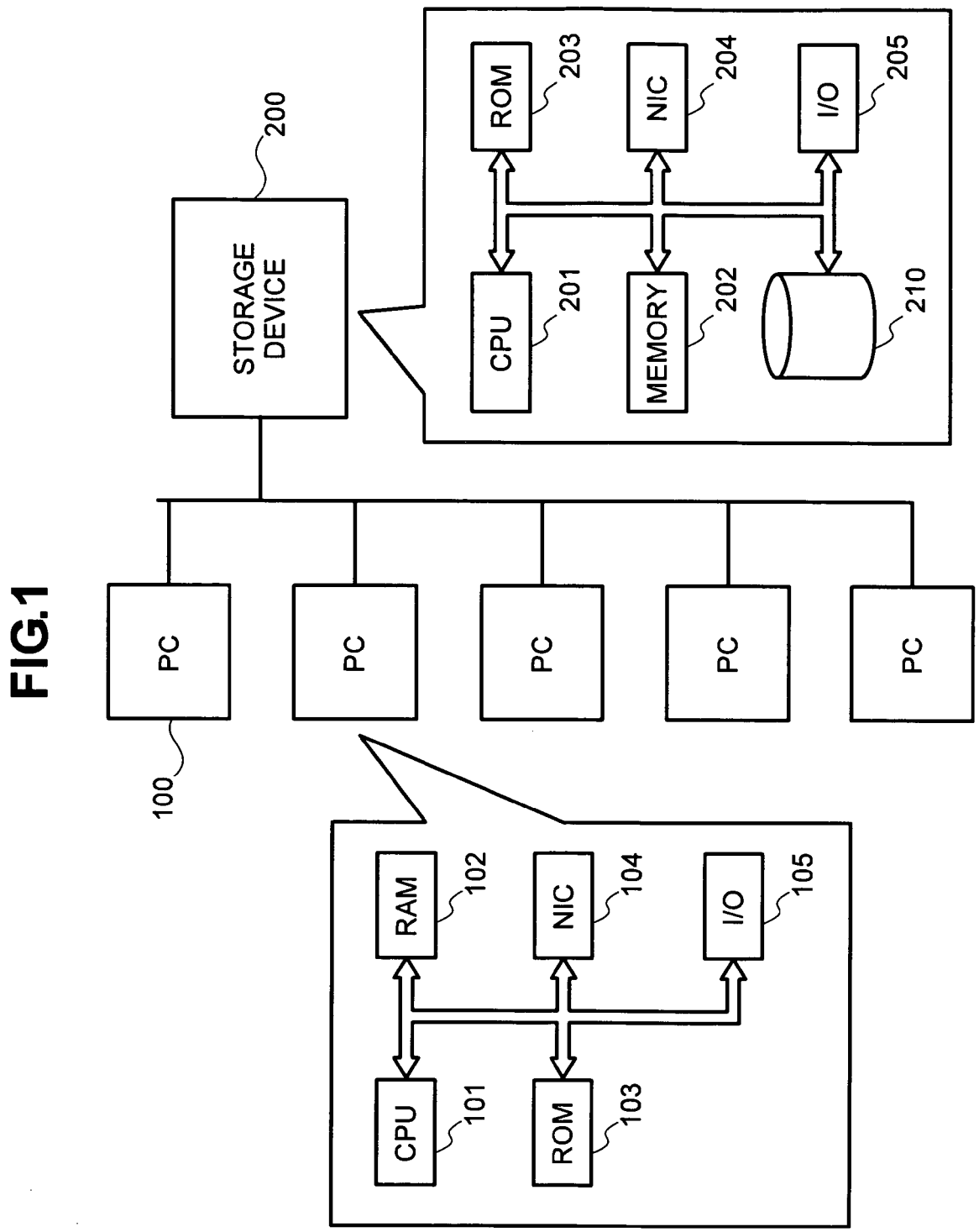
FIG. 1 is an explanatory view of the constitution of a computer system constituting an embodiment example.

FIG. 1 shows a constitutional example of a computer system of a first embodiment. The computer system comprises a mass storage device (hereinafter also referred to as 'storage device') 200 and a plurality of computers 100. The storage device 200 is mutually connected to the plurality of computers 100 via a network. Here, a LAN, an intranet, the Internet, or the like, can be adopted as the network. Further, although the IP can be assumed to be the protocol used by the network in this embodiment, other protocols are also acceptable.

The storage device 200 comprises a CPU 201, memory 202, ROM 203, network interface card (also called an 'NIC' hereinbelow) 204, I/O unit (hereinafter also called 'I/O') 205, and a disk device 210. These respective parts are mutually connected by means of a bus, switch, and the like. The storage device 200 supplies data stored in the disk device 210 to each of the computers 100. Further, the computers 100 each store data in the disk device 210. The NIC 204 is an interface allowing the storage device 200 to exchange data via the network. The I/O 205 is an interface for a connection with I/O devices (keyboard, mouse, display, and the like, for example).

The disk device 210 is constituted by one or a plurality of disk devices. The disk device 210 may have a RAID constitution with redundancy. In this case, the CPU 201 performs RAID control. Further, the storage device 200 creates logical storage regions (hereinafter 'volumes') from the physical storage region of the disk device 210. The computers 100 thus use the storage device 200 in which the units are generally volumes.

In the storage device 200, the CPU 201 controls the exchange of data in accordance with a control program that is stored in the disk device 210 and ROM 203. The memory 202 is a storage medium that is used while the program is operating. Further, in the storage device 200, a control block may be rendered by integrating each of the parts excluding the disk device 210. In this case, the control block comprises an interface connected to the computers 100, an interface connected to the disk device 210, a control processor, and a memory, and so forth.

In this embodiment, the computer 100 is a diskless computer that does not comprise a disk device. The computer 100 may also be an ordinary computer with a disk device. The computer 100 comprises a CPU 101, a RAM 102, ROM 103, NIC 104, and I/O 105. By reading files such as those for the required operating system (hereinafter also called 'OS') from the storage device 200 at startup, the computer 100 performs remote booting. The remote booting program is stored in the ROM 103 beforehand.

Figure 2:
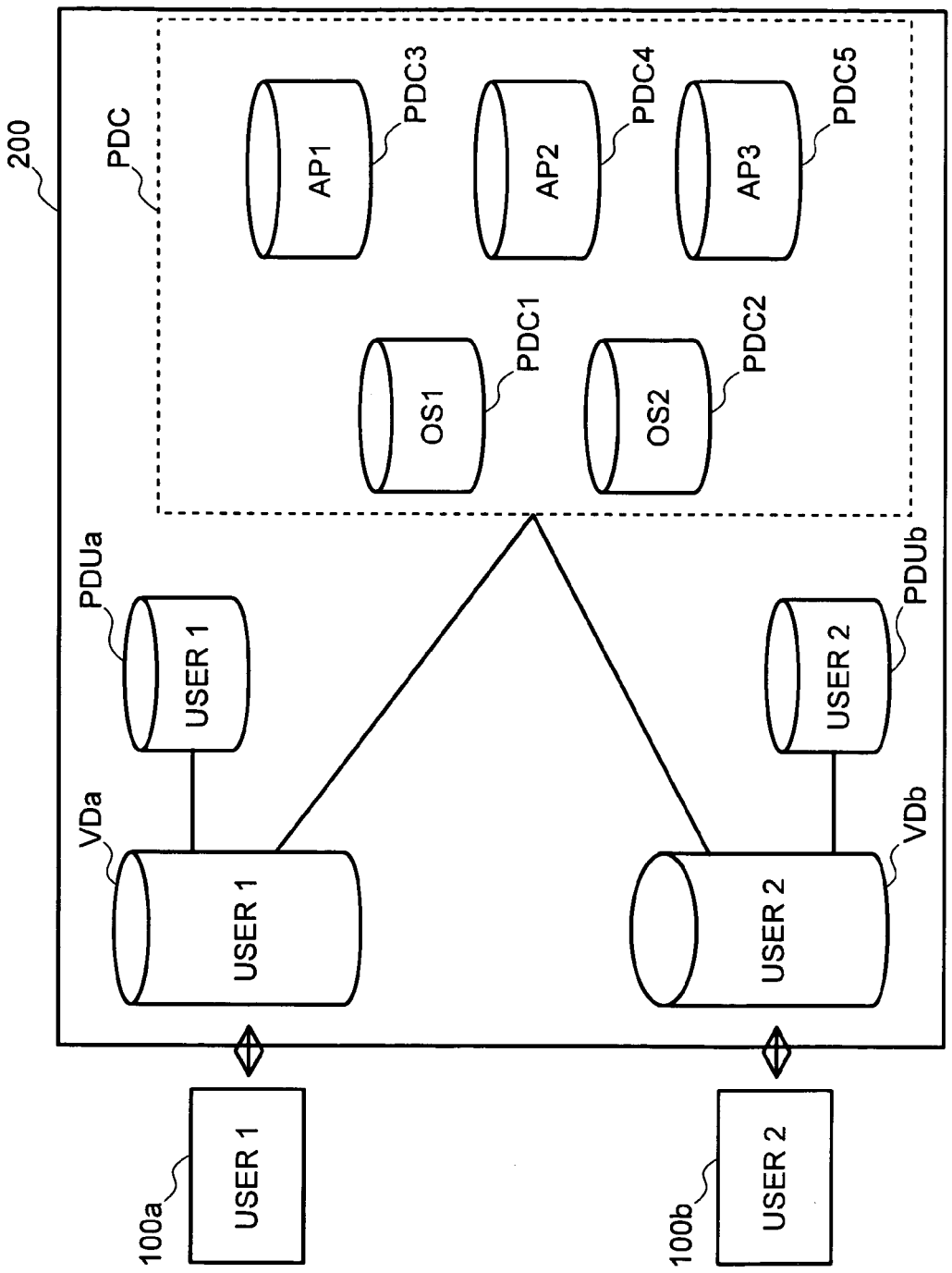
FIG. 2 is an explanatory view schematically showing the data storage and readout states.

FIG. 2 schematically shows the data storage and reading of this embodiment. Here, two computers 100a, 100b are connected to the storage device 200. Further, the 'computers 100a, 100b' as mentioned here denote, not only hardware computers, but also states where the users using the computers use software (including OS) executed by these computers on the basis of rights for using certain software (hereinafter also called 'licenses'). Therefore, computers 100 in this state are also referred to as 'clients 100'. Further, the user using client 100a is user 1, and the user using client 100b is user 2.

Virtual volumes VDa and VDb corresponding with clients 100a and 100b respectively are defined in the storage device 200. 'Virtual volumes VDa and VDb' denotes not only physical storage regions provided in the disk device 210 of the storage device 200 but also logical storage regions allocated to each user in order to manage the data of each user. The virtual volumes VD are each constituted by one or a plurality of volumes ('volumes PD' hereinafter).

Volumes (hereinafter 'private volumes') PDUa, PDUb allocated specifically to the clients 100a and 100b respectively are defined for the volumes PD that the disk device 210 comprises. Further, volumes that are shared by both parties (hereinafter 'shared volumes') PDC are defined. Further, although five shared volumes PDC are described in the present embodiment, in reality there may be only a few.

Software that can be shared by both parties is stored in PDC1 to PDC5. In this embodiment, storage in the shared volumes PDC is assumed to be as follows: an operating system (hereinafter 'OS') 1 is stored in PDC1, an OS 2 in PDC2, an application program (hereinafter 'AP') 1 in PDC3, an AP2 in PDC4, and an AP3 in PDC5. Further, the VDa is associated with the private volume PDUa and shared volumes PDC. VDb is associated with the private volume PDUb and shared volumes PDC.

The client 100 transmits a request to the storage device 200 to designate a virtual volume VD and read data at a variety of times such as during remote booting. The storage device 200 selects and reads data corresponding to the virtual volume VD designated by the read command from the private volume PDU or shared volume PDC and sends this data back to the client 100.

Figure 3:
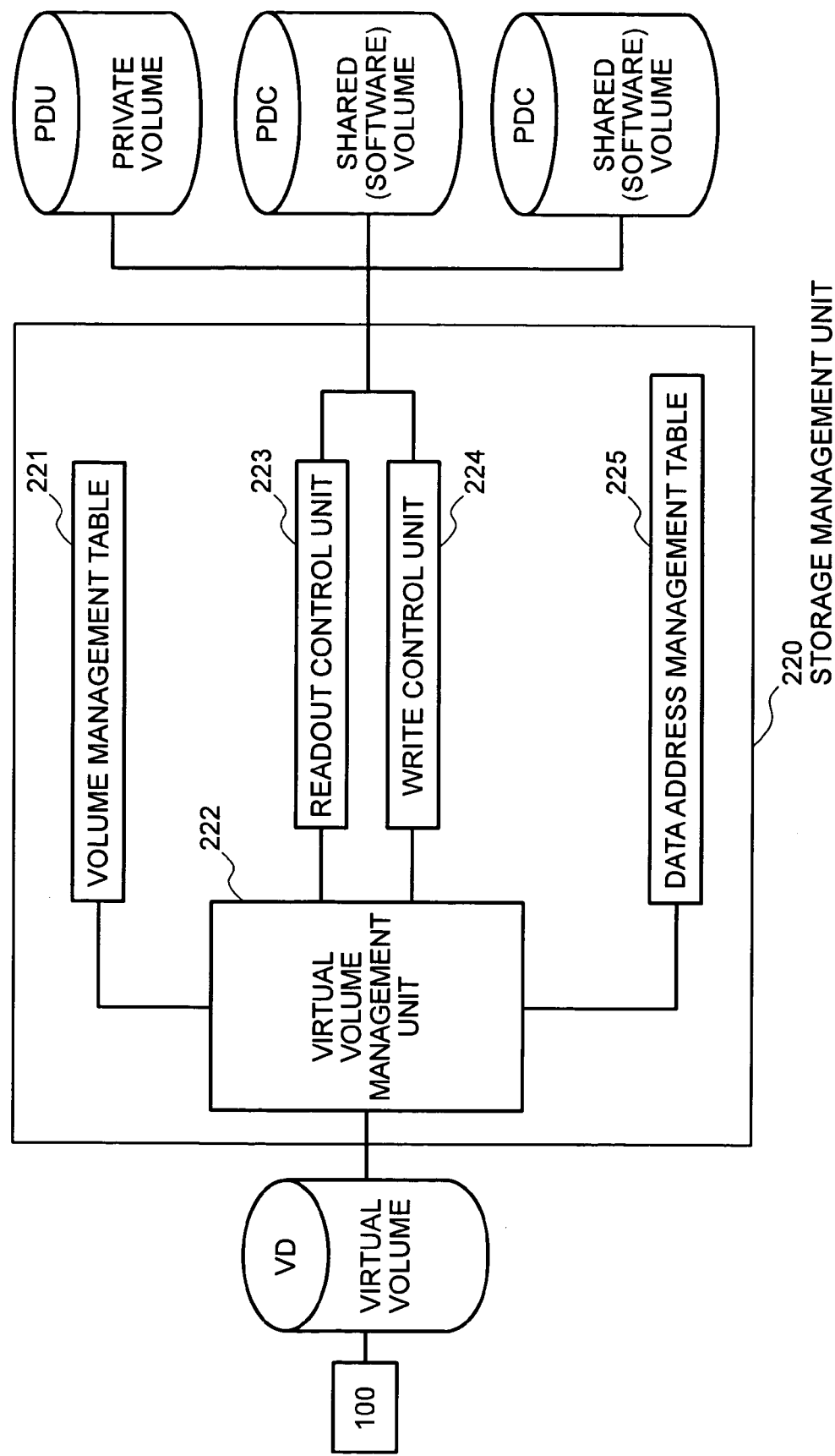
FIG. 3 is an explanatory view of the constitution of the storage management block 220.

FIG. 3 shows a constitutional example of the volume management block 220 of the storage device 200 for building a virtual volume VD from the corresponding volume PD. Further, the volume management block 220 may be implemented as dedicated hardware or may be implemented as a program that is run by the CPU 201 or control block of the storage device 200. When implemented as dedicated hardware, the volume management block 220 is added to the constitution of the storage device 200 of FIG. 1.

The volume management block 220 comprises a virtual volume management block 222, readout control block 223, write control block 224, volume management table 221 and data address management table 225. Further, when the volume management block 220 is a program, the virtual volume management block 222, readout control block 223 and write control block 224 are then subprograms of the volume management block 220. Further, in this case, the respective programs, the volume management table 221 and data address management table 225 are stored in the memory 202.

Information indicating the relationship between the virtual volume VD and the volume used by the client 100 is stored in the volume management table 221. Further, address information for the private volume PDU that is afforded a higher access priority than the shared volume PDC, which is address information in the storage device 200 of each volume, is registered in user units in the data address management table 225.

The virtual volume VDa allocated to the client 100a is built by the virtual volume management block 222 in the volume management block 220. When the client 100a starts up, the virtual volume management block 222 acquires identification information (MAC address, IP address, UID, or the like) for the activated client 100a. The virtual volume management block 222 then acquires information linking the client 100 specified by the identification information thus acquired and the volume in the storage device 200 from the volume management table 221. More specifically, the virtual volume management block 222 acquires target volume PD names (here, PDUa, PDC1 and PDC3) and information on the attributes (shared or private) of these volumes from the volume management table 221. The virtual volume management block 222 then builds the virtual volume VDa by using the information thus acquired.

In reality, the volume management block 220 uses the received information to implement processing (pointer processing) to link the logical address value of the virtual volume and the address value that manages the volume in the storage device 200. As a result, one virtual volume is built by a plurality of volumes PD.

In this embodiment, the readout control block 223 follows predetermined rules when reading data from the volumes PD corresponding with the virtual volume VD. Here, 'predetermined rules' are rules according to which the search for the private volume PDUa is prioritized over that for the shared volumes PDC1 and PDC3 in the volume PD corresponding with the virtual volume VD when the client 100 retrieves (reads) data in the virtual volume VD, for example. As a result, the storage device 200 is able to prioritize the search for client-specific setting information of an application program, OS, or the like (that is, setting information for a default not used by anyone is not shown to a client that already has setting information). Further, the readout control block 223 communicates the value of the address of the private volume PDU afforded search priority, to the virtual volume management block 222.

Further, the write control block 224 also follows the rule above. That is, this is a rule according to which a request from the client 100a to write to a data region that corresponds to shared volumes PDC1 and PDC3 allocated to the virtual volume VDa is transferred to and executed by the private volume PDUa. Thereupon, the write control block 224 reports the address value of the transfer destination to the virtual volume management block 222. Each address reported by the readout control block 223 and the write control block 224 to the virtual volume management block 222 is included in the data address management table 225.

FIG. 4 shows an example of the constitution of the volume management table 221. Information indicating the usage status of the software in the shared volume PDC of the user is registered in the volume management table 221. As mentioned earlier, information on the software usage status of the user and the relationship between the virtual volume VD, the shared volume PDC and private volume PDU is also registered in the volume management table 221.

The user defined here is identified by using the MAC address of the client 100. However, the storage device 200 may recognize the client 100 by using another method (IP address or similar, for example). Further, when one computer 100 is shared by a plurality of users, the storage device 200 discriminates the client 100 by means of a combination of the identification information allotted to the computer 100 and the ID allotted to the user. Further, in this embodiment, the user, client 100, virtual volume VD and volume are associated in pairs. However, this relationship can be suitably changed (a plurality of users use one virtual volume, and so forth, for example) based on the licensing arrangements of the respective software.

Further, as described subsequently, license information relating to individual application programs of individual clients may be registered in the volume management table 221. In this case, the presence or absence of a license for individual application programs of individual clients, the license content, license key information, the license acquisition status, and so forth, may be considered as such registered information. The storage device 200 judges whether each client can use an application program by using this information.

In addition, the content of the volume management table 221 is mainly set by the administrator of the computer system comprising the storage device 200 (hereinafter the 'administrator'). The specific update method will be described subsequently. FIG. 4 shows that user 1 uses OS1, AP1, AP3 software and user 2 uses OS2, AP2, AP3 software. Further, the names of shared volumes in which shared software is stored and the names of private volumes allocated to each client are also associated and managed in the volume management table 221.

The storage device 200 references the volume management table 221 and selects the shared volume that is to be allocated to the client 100 from the shared volumes PDC. Therefore, based on information in FIG. 4, the virtual volume VDa allocated to client 100a is associated with the private volume PDUa, and shared volumes PDC1, PDC3, and PDC5, and the virtual volume VDb allocated to the client 100b is associated with the private volume PDUb, and the shared volumes PDC1, PDC4 and PDC5.

Figure 5:
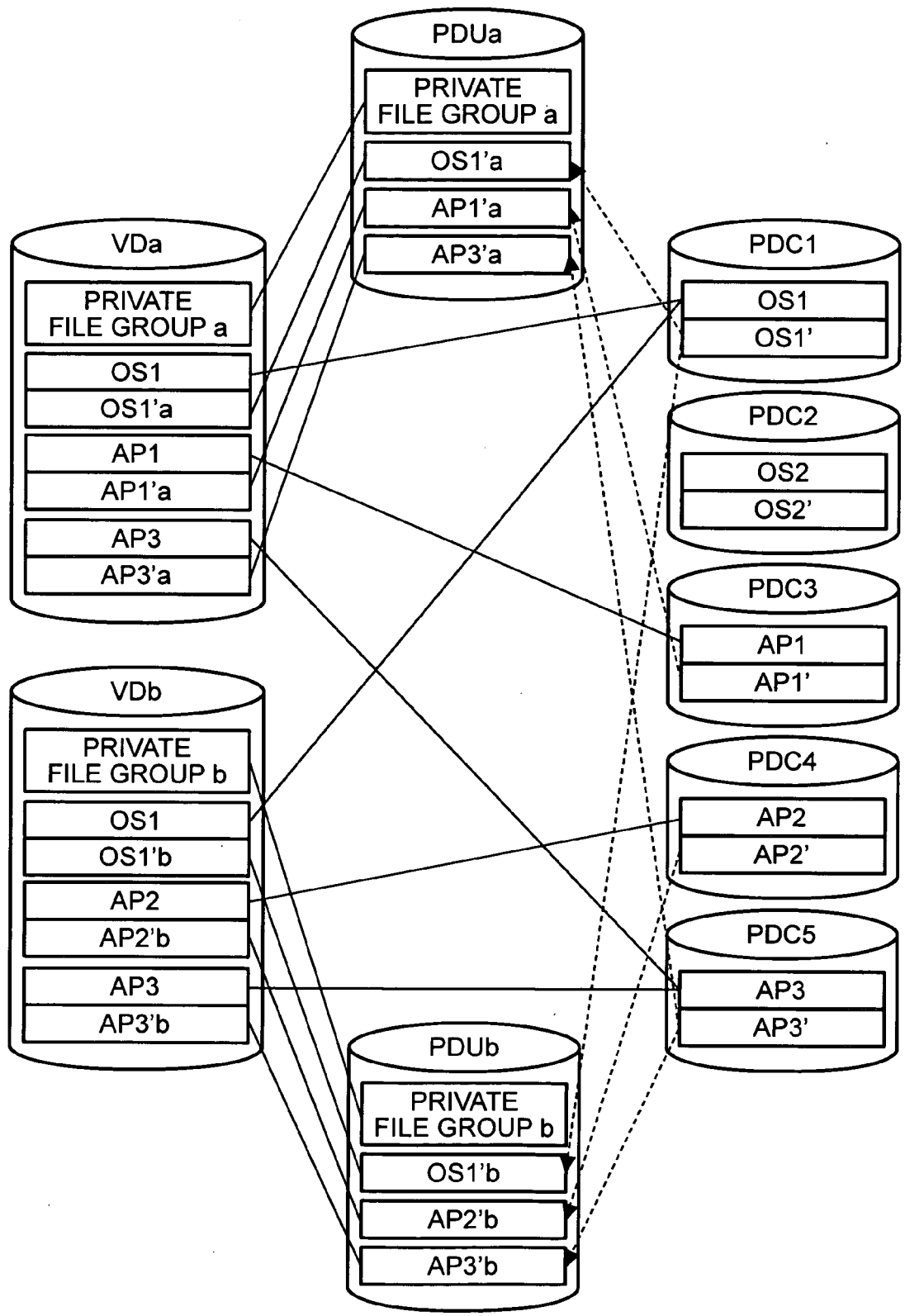
FIG. 5 is an explanatory view of the constitutional state of the virtual volume VD.

FIG. 5 schematically shows the relationship between the virtual volumes VD allocated to each user, and the private volumes PDU and shared volumes PDC that the storage device 200 comprises. On the left-hand side of FIG. 5, the content stored in the virtual volumes VDa and VDb managed by the storage device 200 is shown, while the content stored in the private volumes PDUa, PDUb, and the shared volumes PDC1 to PDC5 is shown on the right-hand side.

By allocating the volumes of the storage device 200 to the users as detailed above, storage is actually such that, of the content stored in the virtual volume VDa allocated to the client 100a, a private file group a is stored in the private volume PDUa, OS1 is stored in the shared volume PDC1, AP1 is stored in the shared volume PDC3, and AP3 is stored in the shared volume PDC5. Further, likewise also for the client 100b, the content stored in the virtual volume VDb is stored in the private volume PDUb and shared volume PDC respectively.

Further, in this embodiment, as described above, in cases where a write request is a request to modify a file stored in the shared volume PDC, based on information registered in the data address management table 225, the write control block 224 performs processing to copy the target file to the private volume PDUa and update the content of the copied file based on the modification request, before reporting the write destination address (address for accessing the copied file) to the virtual volume management block 222.

FIG. 9 shows a constitutional example of the data address management table 225. FIG. 9 illustrates the managed content of data addresses that are allocated to virtual volume VDa used by user 1. Further, in this embodiment, the data address management table 225 exists in each virtual volume VD, that is, for each user. However, these individual user tables may also be integrated as one table.

Here, file 1 indicates that a shared file at address 003 in the shared volume PDC1 is rewritten by user 1 and then transferred and written to address 001 in private volume PDUa. That is, this indicates that the storage data region is processed with a link (pointer) to the write destination region. File 2 indicates that a shared file is at address 002 in the shared volume PDC3 and shared without modification. File 3 indicates that a file newly created by user 1 is stored at address 024 in private volume PDUb. File 4 indicates that address 024 in private volume PDUa newly created by user 1 is modified by user 1 and stored at the same address. Further, although a read-destination data address does not appear in file 5, the file at address 012 in the shared volume PDC1 previously allocated to the virtual volume VDa of user 1 is deleted by user 1 and the processing for the link (pointer) between the virtual volume VDa and the shared volume PDC1 is cancelled. The process for deleting data in the shared volume will be described subsequently.

Further, when the same file is rewritten by a plurality of users, the information on the addresses of the files in the private volume PDU is managed in the data address management table 225 of each user.

Figure 8:
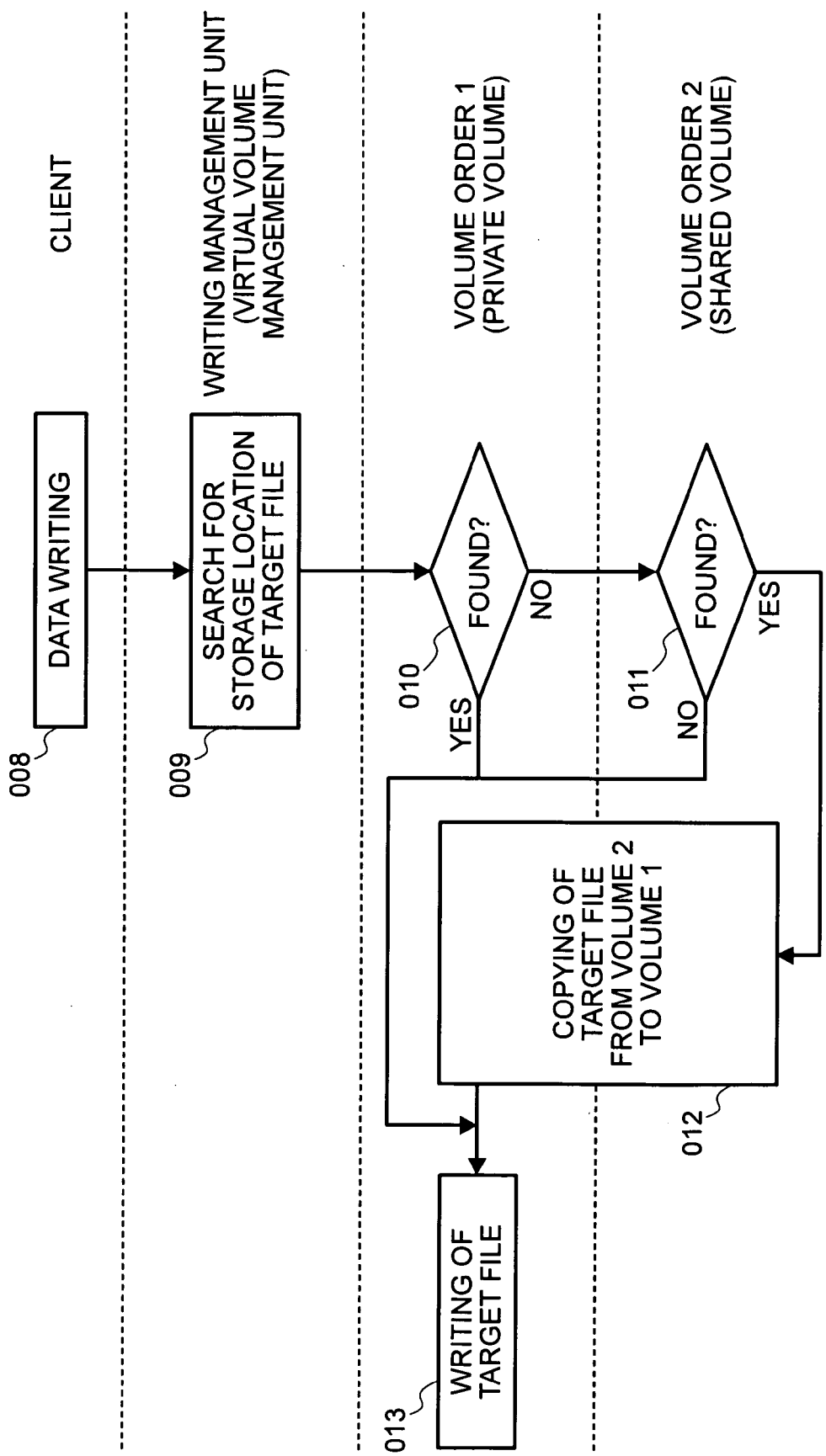
FIG. 8 is a flowchart showing the functions of a write control block 224.

FIG. 8 is a flowchart showing an example of the processing of the virtual volume management block 222 and write control block 224.

The virtual volume management block 222, which receives a data write command (step 008) from the client 100, retrieves the storage location of the target file in the virtual volume VD corresponding with the client 100. Here, the virtual volume management block 222 establishes the order of the searched volumes ('volume order' hereinafter), assigning a higher priority to the private volumes than the shared volumes (step 009) on the basis of information on the data address management table 225. The write control block 224, which receives the volume search order and write command from the virtual volume management block 222, first retrieves the storage location of the file that is the write target in the private volume that is volume order 1 (step 010).

When the target file has been found, the write control block 224 performs data writing (step 013). When the storage location of the target file is not found in the private volume in step 010, the write control unit 224 searches for the storage location of the target file of the write command in the shared volume of volume order 2 (step 011). When the storage location of the target file is not found in step 011 even in the shared volume, the file is a newly created file and therefore the write control block 224 stores the data in the private volume in accordance with the write command. Here, the virtual volume management block 222 updates the content of the data address management table 225 (step 013).

On the other hand, when the target volume of the write command is found in the shared volume in step 011, the write control block 224 copies the target file thus found from the shared volume to the private volume and updates the content of the copied file. Thereupon, the virtual volume management block 222 updates the content of the data address management table 225 (step 013). Thus, writing from the client 100a must be to the private volume PDU of the corresponding user 1, and the content of the shared volume PDC is held without being changed.

Further, a file transferred to the private volume PDU from the shared volume PDC by the write control unit 224 and stored in the private volume PDU is mainly used as setting information for the user of the software. Accordingly, software setting information OS1'a, AP1'a, and AP3'a are stored, in addition to the private file group a of user 1, in the private volume PDUa used by client 100a.

Further, as described above, a priority order is established by the readout control block 223 for those volumes from which data is read.

Figure 7:
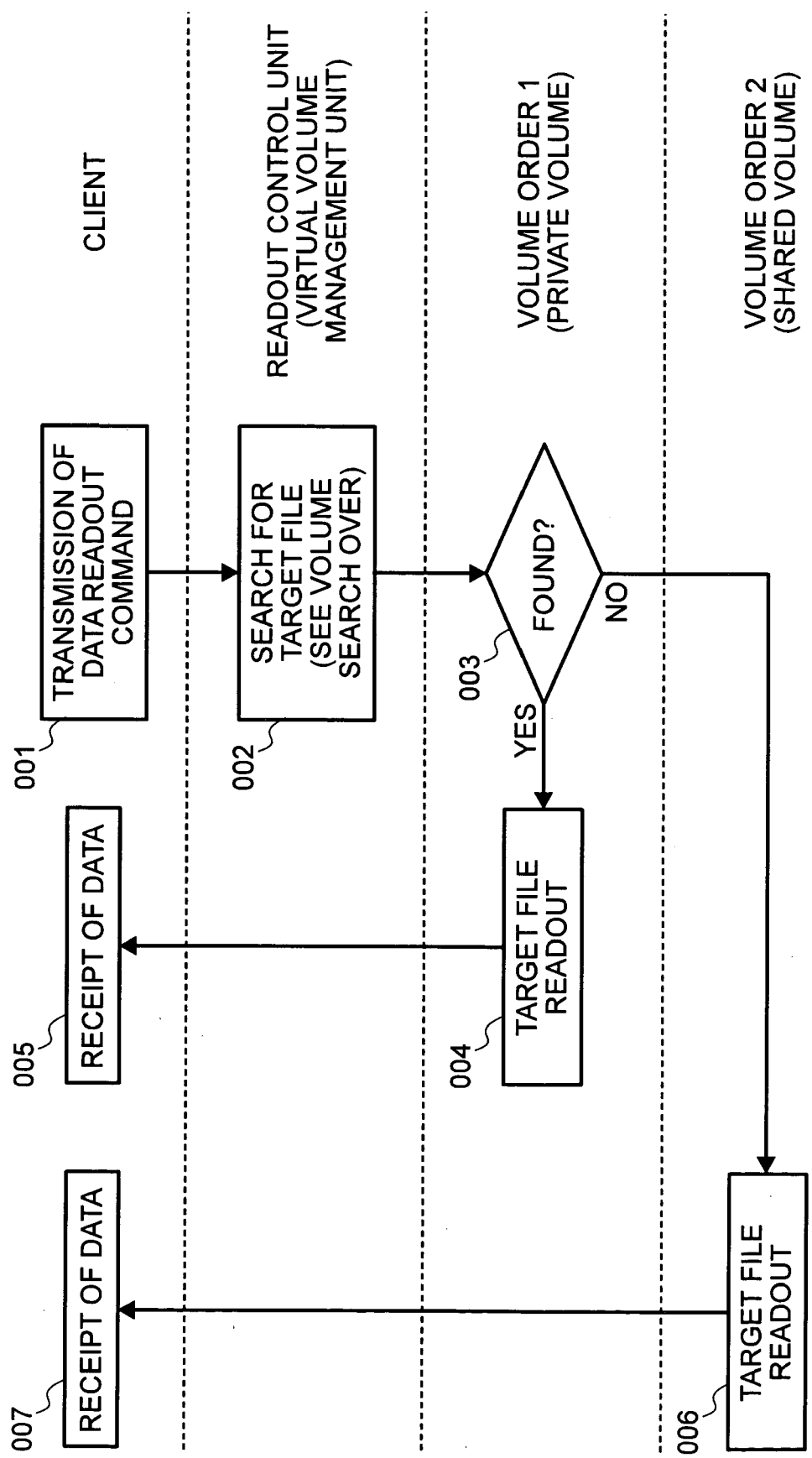
FIG. 7 is a flowchart showing the functions of a readout control block 223.

FIG. 7 is a flowchart showing the details of processing by the virtual volume management block and readout control block 223. First, when a data read command is sent from the client 100 to the storage device 200 (step 001), the virtual volume management block 222 confirms the virtual volume corresponding with the client 100 based on the volume management table 221. The virtual volume management block 222 then identifies the search order of the read target from information registered in the data address management table 225. Here, information on the address to prioritize (corresponds to the address of the private volume as mentioned earlier) is stored in the data address management table 225, and hence the virtual volume management block 222 sends a volume order instruction to prioritize the reading of a private volume over that of a shared volume among the virtual volumes corresponding to the client 100, to the readout control unit 223 (step 002).

The readout control unit 223, which receives the instruction from the virtual volume management block 222, first searches for the target file from the private volume with volume order 1 (step 003). When search target data is found, the readout control unit 223 reads the target file and sends same to the client 100 (step 004). The client 100 then receives the target data (step 005).

On the other hand, when the target file is not found in the private volume with volume order 1 in step 003, the readout control unit 223 searches for the target file in the shared volume with volume order 2 and then reads the target file before sending same to the client 100 (step 006). The client 100 then receives the file (step 007).

As mentioned earlier, the readout control unit 223 prioritizes each private volume for data read out for virtual volumes. Therefore, the setting information for OS1 allocated to the virtual volume VDa, for example, is OS1'a stored in the private volume PDUa, OS1' in the shared volume PDC1 not being allocated. Therefore, the private file group a, OS1, OS1'a, AP1, AP1'a, AP3, and AP3'a of user 1 are allocated to the virtual volume VDa of client 100a, and, likewise, the private file group b, OS1, OS1'b, AP2, AP2'b, and AP3, AP3'b of user 2 are allocated to the virtual volume VDb of client 100b.

The installation of software such as application programs according to this embodiment will be described below. The process used to install software is normally a mechanism in which the data of software installed on a transportable storage medium such as a CD-ROM (hereinafter also called an 'installation disk') is saved in a compressed format and a computer runs a program known as an installer whereby data is extracted, edited and newly created all together and then written to an installation-destination storage device.

However, in this embodiment, in order to render a state where software can be shared by a plurality of users, the administrator installs target software in the shared volume PDC beforehand (hereinafter also called 'pre-installation'). Further, the storage device 200 has a program to allow preinstalled software to be shared by a plurality of users. When pre-installation is complete, each client 100 simply sends a usage request for a new application program or the like to the administrator (or storage device 200) in order to be able to use this application program. The method used for pre-installing and newly employing an application program of the client 100 will be described below.

The process required at the stage of pre-installing software on the shared volume PDC is the extraction of data (also called 'installation data' hereinbelow) that constitutes the software installed. This is because, as mentioned earlier, because the installation data is supplied in a compressed state, data cannot be shared by a plurality of users while still in this same state and software cannot be operated. The simplest extraction method is one in which the software is extracted and the installation data is then stored in the mass storage device by first using an installation disk to perform the installation on a computer comprising a mass storage device. This method then involves copying data via a network or the like to the shared volume PDC.

Figure 15:
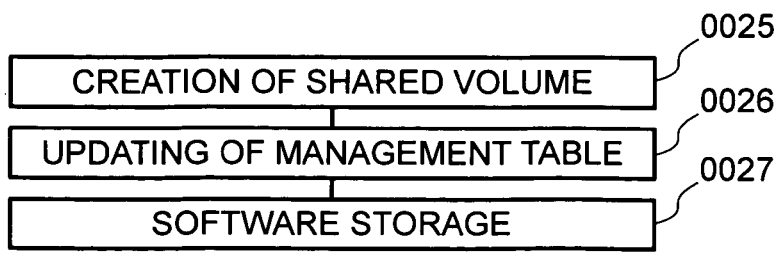
FIG. 15 is a flowchart showing the process for a new software pre-installation operation.

FIG. 15 shows an example of the processing procedure for a case where software is pre-installed on the storage device 200. First, the administrator decides on the new software to be supplied to each user (hereinafter 'new software') and instructs the storage device 200 to create a new software shared volume PDC. Having received the instruction, the storage device 200 then selects the new software shared volume PDC from its own volume group (step 0025). The storage device 200, which has selected the shared volume PDC, then adds a new software field to the volume management table 221 (step 0026). Thereafter, the administrator pre-installs the new software on the selected shared volume PDC (step 0027).

Next, the processing procedure according to this embodiment in which the user is newly supplied with software by the storage device 200 will be described. As an example, a case where the AP1 stored in the shared volume PDC3 is allocated to user 1 who uses OS1 stored in the shared volume PDC1 will be described. Needless to say, at this time, AP1 has already been preinstalled.

In a state where the OS1 alone has been allocated to client 100*a*, OS1 in the shared volume PDC1, and setting information OS1'*a* for OS1, which is changed for usage by client 100*a* in the private volume PDUa, are allocated to the VDa used by client 100*a*.

Figure 6:
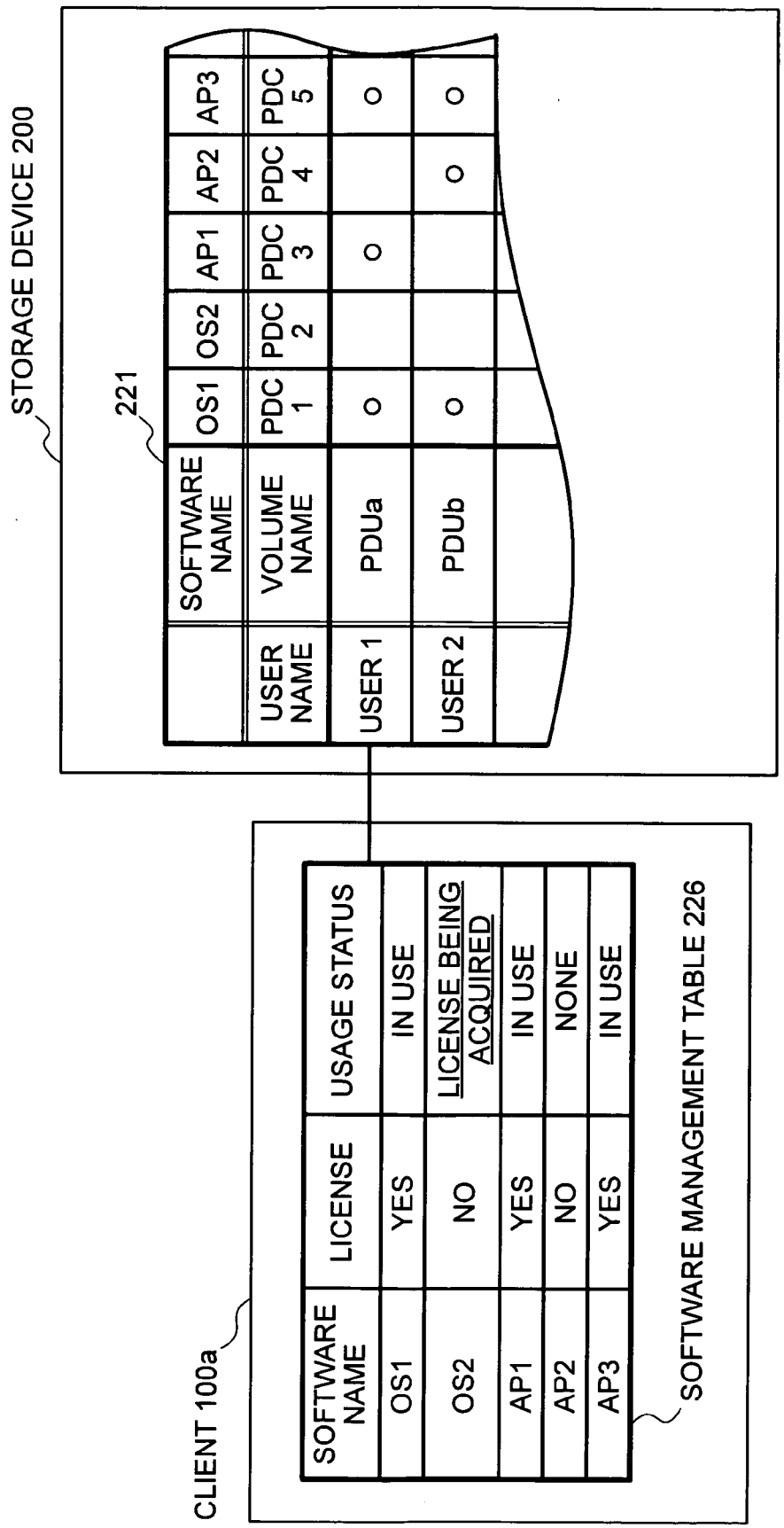
FIG. 6 is an explanatory view of the link between a software management table 226 and the volume management table 221.

First, the administrator or similar (or storage device 200) distributes (FIG. 6) the list of installable software (volumes) from the volume management table 221 stored in the storage device 200 to the computers 100 beforehand in a format such as the software management table 226. The distribution method is such that the storage device 200 creates the software management table 226 by using the content of the volume management table 221 and then sends the software management table 226 to the computer 100 via a network when the computer 100 starts up (or when a new computer is added or when the constitution of an application program stored in the storage device 200 is changed, and so forth), for example.

When the administrator or the like (or storage device 200) distributes the software management table 226 to each client, he or she may add and distribute information on which licenses the distribution partner clients have for particular application programs based on license information registered in the volume management table 221. For example, in FIG. 6, the client 100*a* is in the process of acquiring a license for OS2, but there is no license for AP2. Therefore, client 100*a* uses a variety of information to confirm whether the clients themselves must acquire a license and is then able to report application program usage to the administrator.

User 1 selects the application program he or she wishes to use by confirming the content of the software management table 226 thus relayed. Further, when user 1 employs computer 100*a* to use AP1, for example, this fact is communicated to the storage device 200. The communication method may be an oral communication from the user to the administrator or communication in which the client 100 communicates with the storage device 200 via a network.

Having received the AP1 usage request, the administrator (or storage device 200) confirms whether user 1, who issued the usage request, has acquired a license for AP1, which is to be the request target. Although a variety of methods may be considered, one example is a method in which the administrator scans software license regulations by means of a manual operation and registers the license key that the user (client) is supposed to enter when using the software in the corresponding user field in the volume management table 221. Further, when the user newly requests usage of the application program, the administrator (or storage device 200) asks the client 100 to input the license key. The virtual volume management block 222, which accepts license key inputs, then checks the inputted license key against the license key registered in the volume management table 221. When the license keys match, the virtual volume management block 222 updates the volume management table 221 to enable usage of the requested application program and allocates the shared volume PDC3 in which the requested application program is stored to the virtual volume VDa corresponding with a client newly issuing the request.

Further, when AP1 is newly allocated to client 1, information that is required for the client 100*a* to use AP1 on OS1 must be established for AP1 and OS1. This operation is called 'partial installation' hereinbelow.

In addition, a program that is executed when performing a partial installation is known as a partial installer. Normally, user 1, who uses the target software, starts up the installer by means of the client 100*a* and the partial installer is executed in the process. However, in this embodiment, user 1 may simply communicate usage of AP1 to the storage device 200, and startup of the partial installer is executed by the storage device 200 that receives the communication from the client 100*a*.

After confirming the license key, the storage device 200, which receives a communication that user 1 is using AP1, grants the client 100*a* used by user 1 permission to read PDC3 in which the AP1 is stored. As described above, the specific procedure involves the virtual volume management block 222 acquiring the address of the PDC3 and adding the region of PDC3 to the virtual volume VDa, whereby the range of the virtual volume is enlarged.

In addition to enlarging the virtual volume, the storage device 200 starts up the partial installer of the AP1. Of the private volume PDUa and shared volume PDC1, the storage device 200, which starts up the partial installer, prioritizes the reading of OS1 constitution files that are customized for usage by the client 100*a* from the private volume PDUa, whereby the device constitution of the client 100*a* and so forth, and the files required in order for the AP1 to be used by the client 100*a* (on the OS1 specifically) are read.

Thereafter, the storage device 200 writes the information required for the OS1 corresponding with the client 100a in the shared volume PDC1 and writes information required for AP1 in the PDC3 when the client 100a newly uses AP1, based on the content of the file thus read. Here, as mentioned earlier, the write control block 224 of the storage management block 220 switches the writing to the shared volume PDC to the private volume PDU of the user performing the writing. Therefore, data writing is actually executed with respect to the private volume PDUa.

Once this processing is complete, client 1 is able to use AP1. The administrator (or storage device 200) communicates the fact that AP1 can be used to user 1 by word of mouth (or via a network).

Figure 10:
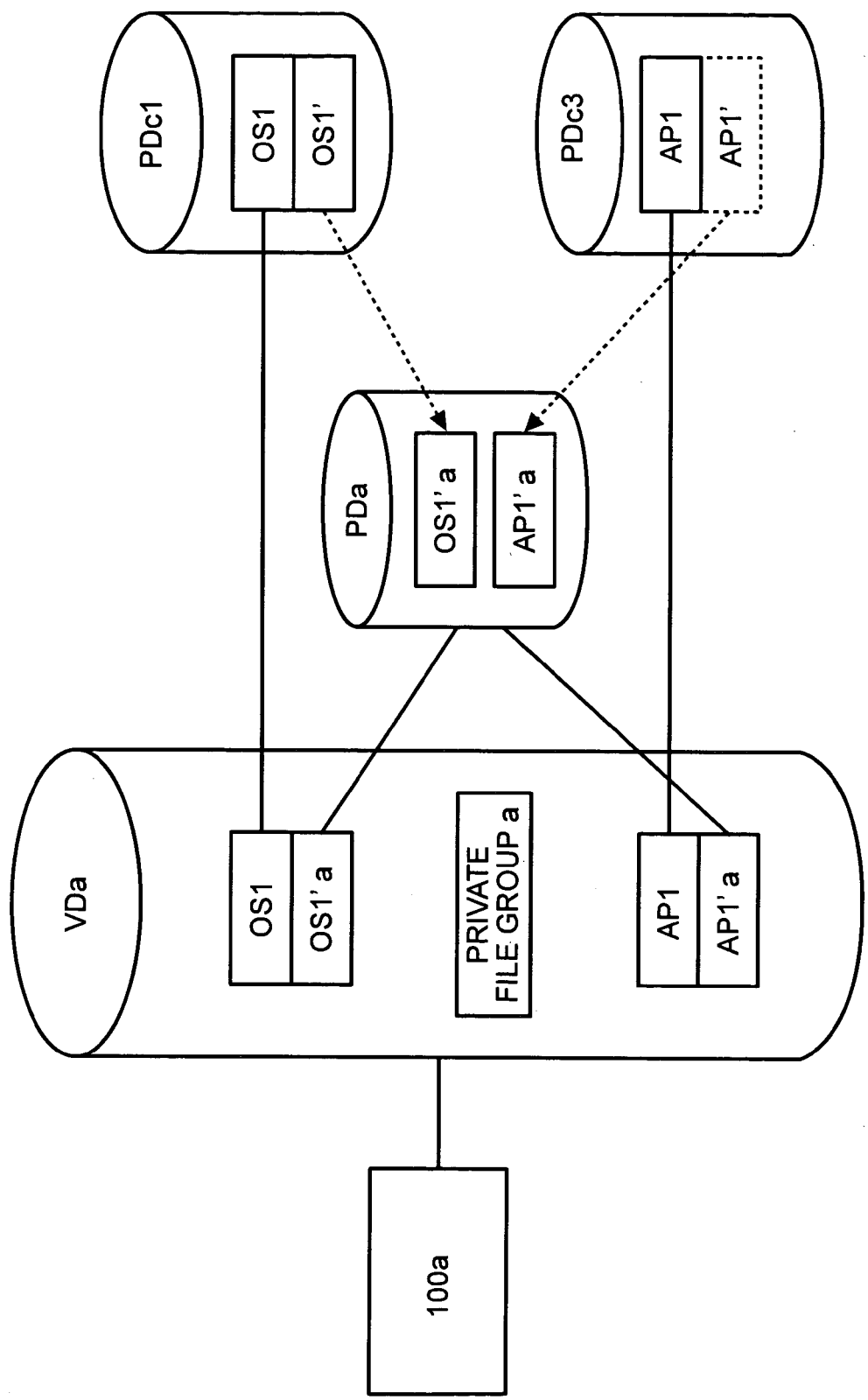
FIG. 10 is an explanatory view of the structure of the virtual volume VD.

As a result, as shown in FIG. 10, when user 1 uses AP1 on OS1, the storage device 200 prioritizes the reading of data of the private volume PDUa that includes data customized for client 100a, and then constitutes OS1 and AP1 by reading data stored in the shared volume PDC1 that stores OS1 and in the shared volume PDC3 that stores AP1. For this reason, user 1 is able to use AP, OS, and so forth, as if each piece of software were installed separately on a volume of the client 100a.

Figure 11:
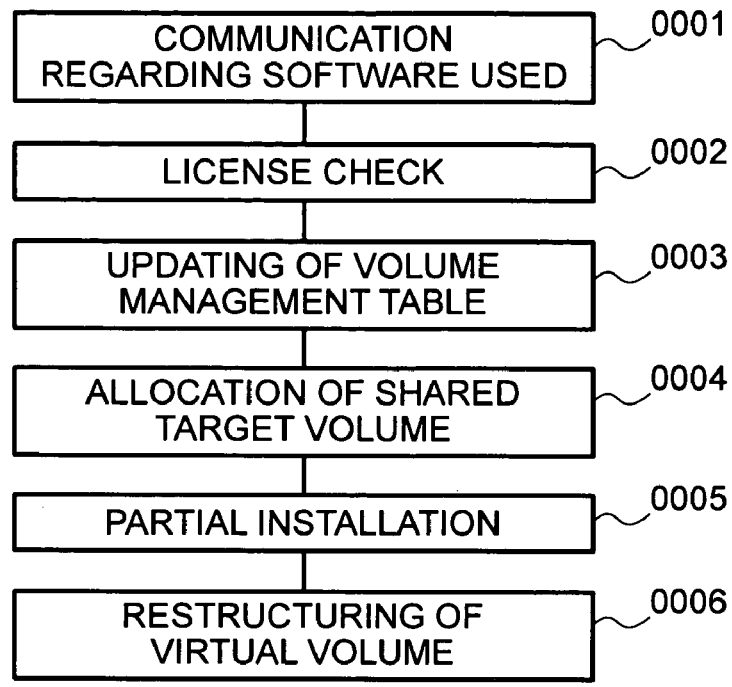
FIG. 11 is a flowchart showing the process for the allocation of new software.

FIG. 11 shows an example of the processing procedure when the client 100 newly uses AP1. As mentioned above, first the client 100, administrator, or the like, reports the software used to the storage device 200 (step 0001). The storage device 200, which receives the communication, then confirms the license key (step 0002) and updates the volume management table 221 (step 0003), and allocates the shared volume in which the target software is stored to the virtual volume VD of the client 100 (step 0004). Next, the storage device 200 performs a partial installation operation of the designated software (0005), rebuilds the virtual volume VD (step 0006) and renders a state in which the client is able to use the designated software.

Figure 12:
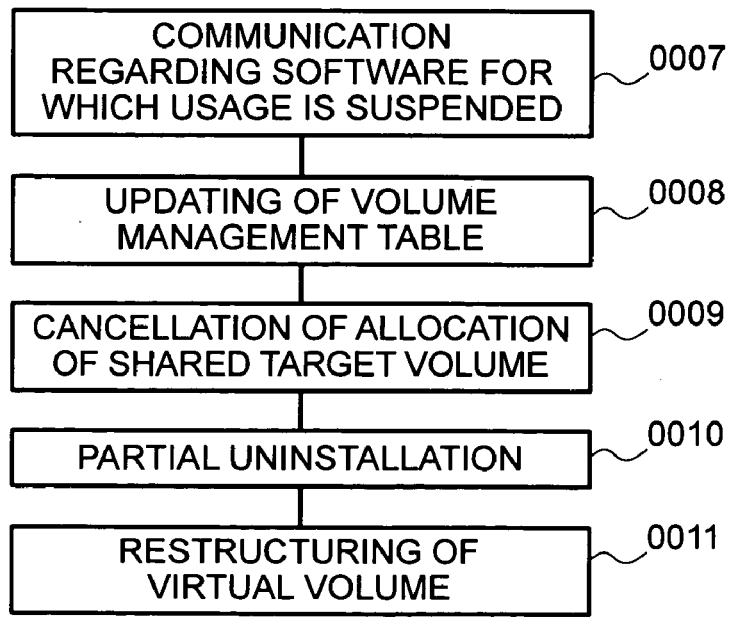
FIG. 12 is a flowchart showing the process for canceling the allocation of software.

FIG. 12 shows an example of the processing procedure when the user ceases to use the software. First, the client 100 reports software whose usage is interrupted to the storage device 200 (step 0006). The storage device 200, which receives this communication, then deletes the relationship between the designated software and client 100 from the volume management table 221 (step 0007) and cancels the allocation to the corresponding virtual volume VD of the shared volume PDC in which the designated software is stored (step 0008). In addition, the storage device 200 deletes the files stored in each private volume PDU that are linked with the designated software (step 0009) and rebuilds the virtual volume VD (step 0010).

Here, the storage device 200 suspends the licenses of software whose usage is interrupted and is able to perform processing to determine the handling of licenses, i.e. with regard to whether usage can be resumed sometime in the future or erasure that includes all licenses is to be performed.

Figure 13:
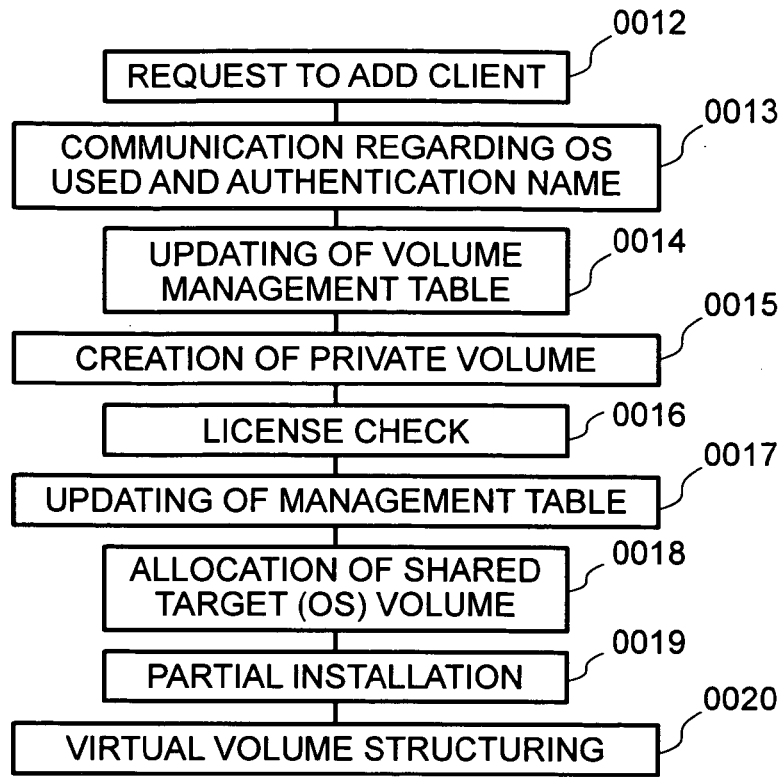
FIG. 13 is a flowchart showing the process for an operation to add a new user.

FIG. 13 shows a procedural example for a case where a user that newly uses the storage device 200 (hereinafter also called a 'new user') is added. First, a new user or similar issues a request to add a new user to the administrator by word of mouth or otherwise (step 0012). In addition, the new user or similar communicates information on the OS used by the new user, personal information (user authentication, a license key, or the like) to the administrator (step 0013). Thereafter, the administrator updates the volume management table 221 of the storage device 200 and adds a user field that corresponds to the new user to the volume management table 221 (step 0014). Upon receiving an update to the volume management table 221, the storage device 200 creates a private volume PDU that corresponds with the new user (step 0015).

Furthermore, after confirming the license key relating to the OS (step 0016), the administrator registers information on the shared volume PDC storing the OS used by the new user in the user field thus added (step 0017). The storage device 200 then uses the shared volume PDC on which the OS is stored and the private volume PDU for the new user (step 0018), reads OS setting information from the client 100 used by the targeted new user and performs a partial installation (step 0019), and then builds the new user virtual volume VD. Thereafter, the procedure illustrated in FIG. 11 is employed to establish the usage of each piece of software. Further, when the computer 100 newly uses the storage device 200, the computer 100 executes a program stored in the ROM 103 beforehand and communicates with the storage device 200. Alternatively, each computer 100 receives a program indicating the processing procedure for accessing the storage device 200 from a management computer via a network and runs this program to communicate with the storage device 200.

Figure 14:
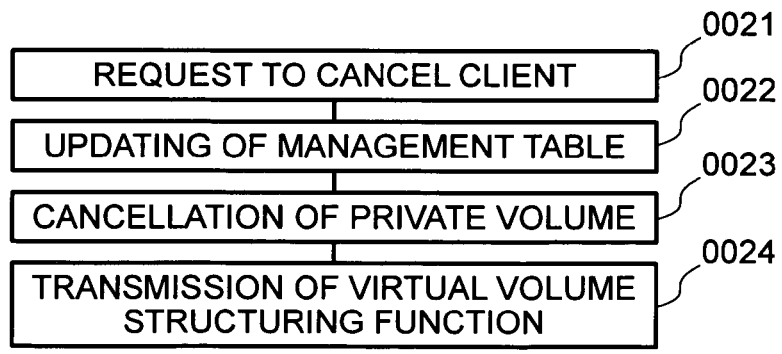
FIG. 14 is a flowchart showing the process for an operation to cancel a user.

FIG. 14 shows the processing procedure for a case where a user using the storage device 200 is deleted (when usage by the user of the storage device 200 has ended). First, the user or similar reports a user whose usage of the storage device 200 has ended to the administrator (step 0021). The administrator, who receives the communication regarding the user whose usage of the storage device 200 has ended, then issues an instruction to the storage device 200 to delete the reported user. The storage device 200, which receives the instruction, then deletes the field of the user designated by the volume management table 221 (step 0022), deletes the private volume PD corresponding to the designated user (step 0023), and then deletes the settings for the virtual volume VD allocated to the designated user (step 0024).

Figure 16:
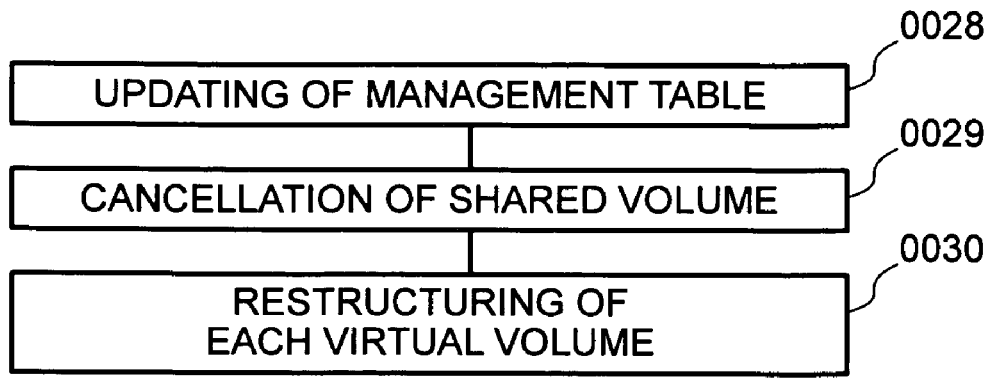
FIG. 16 is a flowchart showing the process for a software uninstall operation.

FIG. 16 shows an example of the processing procedure for a case where the administrator cancels and deletes the supply to the client 100 of software stored in the storage device 200. In this case, the administrator indicates the deleted software to the storage device 200. The storage device 200, which has received the instruction, deletes the field of the software designated by the volume management table 221 (step 0028), deletes the shared volume PDC corresponding with the designated software (step 0029), erases files associated with the designated software from each private volume PDU, and then rebuilds the virtual volume (step 0030). Further, when the provision of software is to end, the administrator or the like communicates information on the software no longer provided to the user in advance. Based on this communication, the user performs a backup of information and so forth that is to be used beforehand.

Further, in this embodiment, when data, which the client 100 has stored in the storage device 200, is erased, the following procedure is performed.

When a command ordering the deletion of data stored in the virtual volume VD is received from the user, the virtual volume management block 222 of the storage device 200 first confirms the content of the command. In cases where the command instructs the deletion of data stored in the private volume PDU, more specifically, in the case of a command to delete data in a private volume PDU for which an address has not been registered in the data address management table 225, the virtual volume management block 222 of the storage device 200 deletes data by executing the delete command sent by the client without further processing.

On the other hand, when the command content orders the deletion of data stored in the shared volume PDC (this data also includes data of the shared volume copied to the private volume), the virtual volume management block 222 of the storage device 200 first checks whether the address of the private volume corresponding with the data whose deletion was designated has been registered in the part corresponding with the user that sent the command for the data address management table 225.

In cases where the address of the data targeted for deletion is registered in the data address management table 225, the virtual volume management block 222 deletes information relating to the data targeted for deletion from the data address management table 225.

After the deletion of information or in cases where information on data targeted for deletion has not been registered in the data address management table 225, the virtual volume management block 222 updates the information of the volume management table 221 and cancels the processing for the link (pointer) between the data region of the virtual volume VD and the volume, for the data targeted for deletion. That is, as per the description of file 5 in the data address management table 225 of FIG. 9, either the data address field of the read destination or the row itself of file 5 in the data address management table 225 is deleted. As a result of this processing, the actual data is not deleted simply by canceling the allocation of data targeted for deletion to the virtual volume VD. As a result of this processing, the data stored in the shared volume PDC that receives the delete command from the client does not exist only in the virtual volume VD.

Further, the data stored in the shared volume PDC can be deleted only as a result of the administrator manipulating the physical volume PD directly by using the management computer. As a result, loss of data stored in the shared volume due to an erroneous operation by a certain client can be prevented.

Figure 17:
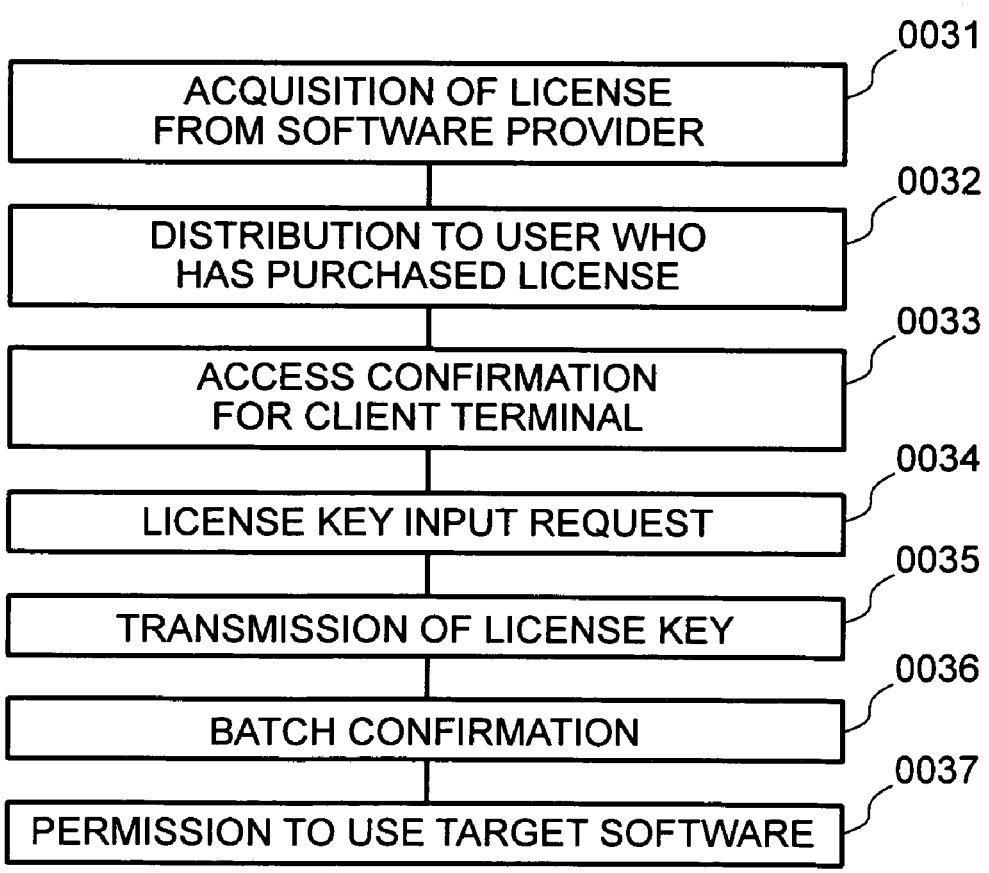
FIG. 17 is an explanatory view of the storage location of the storage management block 220.

FIG. 17 shows an example of the processing procedure when a license is confirmed by the above-mentioned storage device 200. Further, this processing is performed in step 0002 of FIG. 11 and step 0016 of FIG. 13.

The administrator (or storage device 200), which receives request to use an application program (or OS), receives certification of a license allowing the user to use the software (more specifically, a license key) from the distribution source or the like of the software. The administrator (or storage device 200) may also acquire the license key beforehand before receiving the usage request (step 0031).

The administrator (or storage device 200), who has received the license key, ascertains whether the user wishes to purchase a license. When the user wishes to purchase a license, the administrator (or storage device 200) sends the license key received from the distribution source or similar to the user (step 0032). When the computer 100 commences access to the storage device by means of a user operation (step 0033), the storage device 200 issues a request to the computer 100 for the transmission of information relating to the license key (step 0034). Upon receiving the request, the computer 100 receives a license key input from the user and sends this information to the storage device 200 (step 0035). The storage device 200 confirms whether there is a match between the received license key information and the license key communicated to the user (step 0036), and, in the event of a match, grants the user usage of the target software (step 0037).

Further, the processing of steps 0032 and 0033 may be omitted. In such a case, the user acquires the license key from the software distribution source and the storage device 200 or the like does not inquire whether there is a desire to purchase a license.

Further, the processing of the volume management of this embodiment may be executed by a component other than the storage device 200. More specifically, this function can be mounted in a storage management computer connected to the storage device 200 or in each client connected to the storage device. Further, here, 'volume management processing' denotes processing to build a virtual volume VD or processing to read and write data from the virtual volume.

Figure 18:
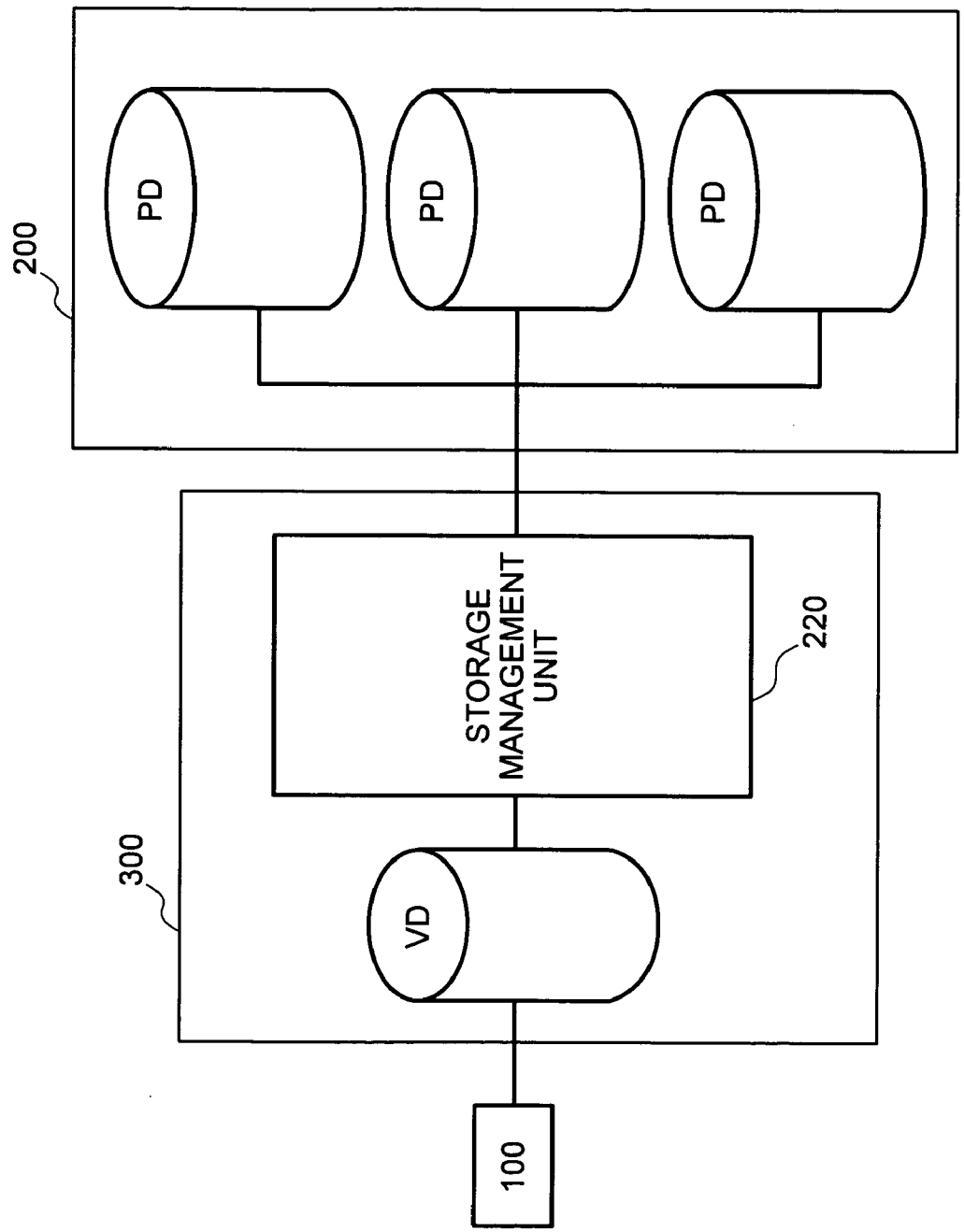
FIG. 18 is an explanatory view of the storage location of the storage management block 220.

FIG. 18 shows an example of the constitution in a case where a storage management computer 300 connected to the storage device 200 carries out volume management. In the CPU (or dedicated device) of the computer 300, the storage management block 220 converts the private volume PD or similar by implementing the above processing and supplies the virtual volume VD to each client 100. Further, the storage management block 220 described here may or may not comprise the volume management table 221. When the storage management block 220 does not comprise the volume management table 221, the storage device 200 comprises the volume management table 221. The storage management block 220 then reads the information of the volume management table 221 from the storage device 200.

Figure 19:
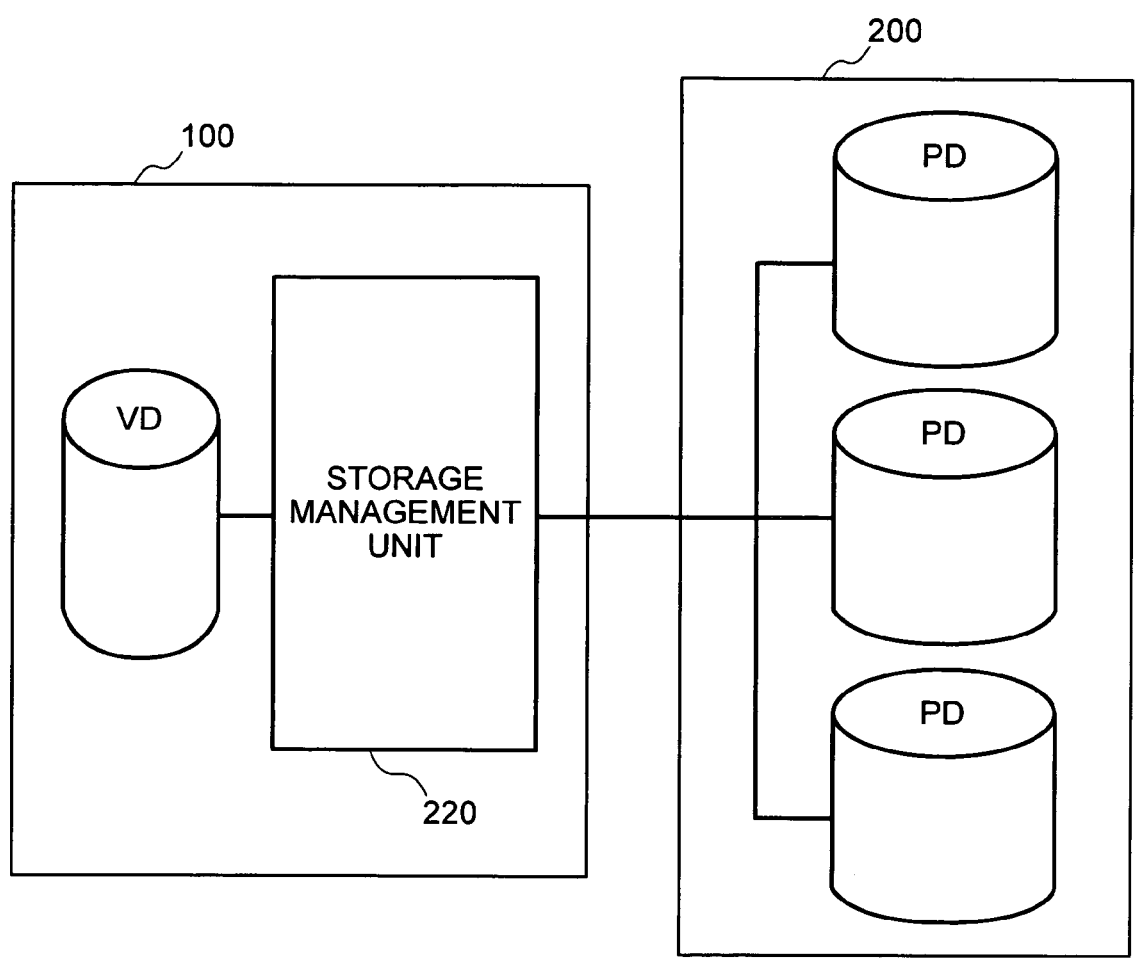
FIG. 19 is an explanatory view of the storage location of the storage management block 220.

FIG. 19 shows an example in which each client 100 is provided with the storage management block 220. In the CPU (or dedicated device) of each client 100, the storage management block 220 converts the private volume PD or similar by executing the above processing and supplies the virtual volume VD to each client 100. Further, in this case, the volume management table 221 is stored in the storage device 200 and shared by the storage management block 220 provided in all the clients 100. Therefore, of the information in the volume management table 221, the storage management block 220 of each client 100 reads out information on only the parts with which same is associated from the storage device 200, and thus builds a virtual volume. Further, of the information in the volume management table 221, each client 100 may comprise, as a subset of the volume management table, information on only those parts with which same is associated. In so doing, the volume of communication between the clients 100 and storage device 200 is reduced.

Further, in the embodiment above, setting instructions for the volume management table 221, the addition/deletion of users by the administrator, the addition/deletion of application programs, and instructions for license management or similar are made as a result of the administrator operating a management computer that is connected to the network of the computer system. However, the management computer and storage device 200 may be mutually connected by means of a different communication line from the network used for the data transfer.

Although the computer 100 was described in the embodiment above by using a diskless computer, a computer with a built-in disk device may actually be used. In this case, the internal disk of the computer can be used as the private volume PDU, cache region, and so forth.

Further, the data stored in the shared volume PDC is not limited to software alone. Data that is shared by a plurality of clients is also acceptable. In this case, because the shared target is not software, there is no user-specific setting information and data can also be shared.

Furthermore, there may be a plurality of pieces of software contained in the shared volume PDC rather than a single piece of software. In addition, a plurality of users can be allocated to a single private volume PDU or virtual volume VD. However, in this case, it is necessary to adhere to the licensing arrangement prescribed by the software provider.

The software partial installer is stored in the volume in which the corresponding software is stored, but may be stored in a separate volume. Further, each user may start up the partial installer instead of the storage device 200. For example, a program for running the partial installer is installed in the computer 100 such that the storage device 200 can be instructed to perform an operation to allocate the new shared volume by means of an operation by user 1.

According to this embodiment, the storage device 200 performs only a read operation with respect to the shared volume PDC that comprises the program main body but does not perform a write operation. Therefore, changes to the main body of the shared software and virus contamination, and so forth, can be prevented.

In addition, a virus check operation may target only respective private volumes. Thus, the operation time can be markedly reduced.

In addition, the administrator is able to directly control a volume of the storage device 200 without a virtual volume being allocated to the administrator. The administrator of the storage device 200 is thus able to consolidate maintenance work such as version upgrades, updates, and so forth, for each piece of software. This is applicable even at the stage where the administrator pre-installs new software.

According to the present invention, software licenses can be managed by managing the association of the software used by the user. In this case, software is desirably stored in the shared volume in units based on the licensing arrangements prescribed by the software providers.

Accordingly, clients constituting logical management units of the virtual volume can be established in units of the computers connected to the storage device, in units of the users using each computer, and in units of the configuration of each user, for example. However, units must be provided according to the above-mentioned licensing arrangements. When computer units are established, a fixed usage configuration can be provided for each computer irrespective of the user using the computer and so forth. If user units are established, it is unimportant which computer is used, and, if configuration units are used, a plurality of usage configurations can be used for each user. The applicability of such usage states must be in line with each licensing arrangement.

The present invention allows the data capacity of a mass storage device to be reduced, is able to increase/decrease the application programs that may be used by the administrator of the mass storage device, and lighten the work load of version management, virus checks, and so forth. Moreover, suitable (measuring up to the PC usage state of the user) license management is permitted.

What we claim:

1. A storage system connected to a plurality of computers, comprising:
a plurality of disk devices including a plurality of virtual volumes configured to correspond to a plurality of users, respectively; and
a control block operatively connected to the plurality of disk devices and configured to control the plurality of disk devices, wherein
at least one of the plurality of virtual volumes includes at least one shared volume in which software used by the plurality of users is stored, and at least one private volume having private information of a corresponding user, and
the control block, in response to a data read command with respect to a first virtual volume, reads data from one of a first private volume and a first shared volume of the first virtual volume corresponding to a first user issuing the data read command and transmits the data to the first user, wherein
the control block retrieves the data based on a priority rule which prioritizes reading from the first private volume at a higher priority than reading from the first shared volume.

2. A storage system according to claim 1,
wherein, based on a data write command with respect to a second virtual volume, the control block writes data corresponding with the write command to the private volume contained in the second virtual volume corresponding with the user of the plurality of users, who indicated that the write command should be issued.

3. A storage system according to claim 2,
wherein, when writing data according to the write command, the control block copies data targeted by the write command to the private volume contained in the second virtual volume, and updates the copied data according to the write command.

4. A storage system according to claim 3, comprising:
a memory,
wherein, when the copying of data to the private volume contained in the second virtual volume occurs on the basis of the write command, the control block stores a first information item about the location where the copied data is stored in the private volume, in the memory, in association with information about the location where copy source data is stored in a shared volume.

5. A storage system according to claim 4, wherein, upon receiving the read command, in cases where information on the copying of data relating to the first user is contained in the first information item stored in the memory, the control block prioritizes the reading of information stored in the first private volume from among the volumes contained in the first virtual volume.

6. A storage system according to claim 5, wherein the memory includes a second information item representing the relationship between a virtual volume, private volume and shared volume of each of the plurality of users.

7. A storage system according to claim 6, wherein an operating system used by a computer is stored in a shared volume and the plurality of computers each start up by using remote booting and reading of the operating system.

8. A storage system according to claim 7, wherein information indicating a relationship between a name of the first user, a name of the private volume of the first virtual volume, a name of the software used by the first user, and a name of the shared volume in which the software is stored, is stored in the second information item.

9. A storage system according to claim 8, wherein, in cases where a user is added, the control block establishes a private volume corresponding with the newly added user from the plurality of volumes, selects a shared volume where the software used by the added user is stored among the at least one shared volume, and creates a virtual volume corresponding with the added user from the established private volume and the selected shared volume.

10. A storage system according to claim 9, wherein, when there is a user who suspends usage of storage, the control block deletes a private volume contained in a virtual volume corresponding with the user who suspends the usage, and deletes information relating to the virtual volume corresponding with the user suspending the usage from the second information item.

11. A storage system according to claim 10, wherein, in cases where software is stored in any of the plurality of volumes, the control block registers a volume where the software is stored in the second information item as the new shared volume.

12. A storage system according to claim 11, wherein, in cases where the usage of software stored in a shared volume is requested by any of the plurality of users, the control block associates the shared volume in which the requested software is stored with the virtual volume corresponding with the user who has issued the request, and then adds information corresponding to the second information item.

13. A storage system according to claim 12, wherein information on a license for software that is stored in the shared volume of each of the plurality of users is included in the second information item; and when the request is received, the control block requests, from the user who has issued the request, information regarding the existence of a license for the software that is the target of the request, and judges whether or not the user who has issued the request is able to use the software on the basis of the information on the existence of a license received from the user who has issued the request and information on the license registered in the second information item.

14. A storage system according to claim 13, wherein, in cases where any of the plurality of users suspends usage of software stored in the shared volume, the control block deletes information on the relationship between the virtual volume corresponding with the user suspending usage of the software and the shared volume in which the software is stored from the second information item.

15. A storage system connected to a plurality of computers, comprising:
a plurality of disk devices including a plurality of virtual volumes configured to correspond to a plurality of users, respectively; and
a control block operatively connected to the plurality of disk devices and configured to control the plurality of disk devices,
wherein
at least one of the plurality of virtual volumes includes at least one shared volume in which software used by the plurality of users is stored, and at least one private volume having private information of a corresponding user, ; and
the control block, in response to a data read command with respect to a first virtual volume, reads data from one of a first private volume and a first shared volume of the first virtual volume corresponding to a first user issuing the data read command, wherein
the control block retrieves the data based on a priority rule which prioritizes reading from the first private volume at a higher priority than reading from the first shared volume, in response to a data write command with respect to a second virtual volume, the control block writes data associated with the data write command in a second private volume of the second virtual volume corresponding to a second user issuing the data write command , wherein
the control block copies data targeted by the data write command and stored in a second shared volume to the second private volume of the second virtual volume, and updates the copied data according to the data write command.

16. A storage system connected to a plurality of computers, comprising:
a plurality of disk devices including a plurality of virtual volumes configured to correspond to a plurality of users, respectively; and
a control block operatively connected to the plurality of disk devices and configured to control the plurality of disk devices,
wherein
at least one of the plurality of volumes includes at least one shared volume in which software used by the plurality of users is stored and at least one private volume having private information of a corresponding user,
wherein the control block uses differing combinations including at least one of the shared volume and at least one of the private volume to create a virtual volume for differing ones of the plurality of users; and
when reading data from one of the plurality of virtual volumes corresponding to a user issuing a read command, the control block checks whether a read command target file is stored in a private volume of the one of the plurality of virtual volumes, and if the target file is in the private volume, the control block reads the target file from the private volume based on the read command, and if the target file is not in the private volume, the control block reads the target file from a shared volume; and
when writing data to one of the plurality of virtual volumes corresponding to a user issuing a write command, the control block checks whether a write command target file is stored in a private volume of the one of the plurality of virtual volumes, and if the target file is in the private volume, the control block updates the target file based on the write command, and if the target file is not in the private volume, the control block searches a shared volume, reproduces the target file in the private volume from the shared volume if the target file is found in the shared volume, and updates the reproduced file based on the write command such that setting information for the user is reflected in software including the target file and stored in the private volume.

17. A storage system connected to a plurality of computers, comprising:
at least one disk device including a plurality of virtual volumes configured to correspond to a plurality of users, respectively
a control block operatively connected to the at least one disk device and configured to control the at least one disk device;
and a volume management table configured to be accessed by the control block,
wherein at least one of the plurality of virtual volumes includes at least one shared volume to store software available to at least one of the plurality of users, and at least one private volume having private information of a corresponding user, wherein the volume management table includes information representing a relationship of each of the plurality of users with the software and the at least one shared volume that stores the software wherein the control block, in response to a data read command with respect to a first virtual volume, reads data from one of a first private volume and a first shared volume of the first virtual volume corresponding to a first user issuing the data read command and transmits the data to the first user, and wherein the control block retrieves the data based on a priority rule which prioritizes reading from the first private volume at a higher priority than reading from the first shared volume.

* * * * *